Patented Dec. 23, 1941

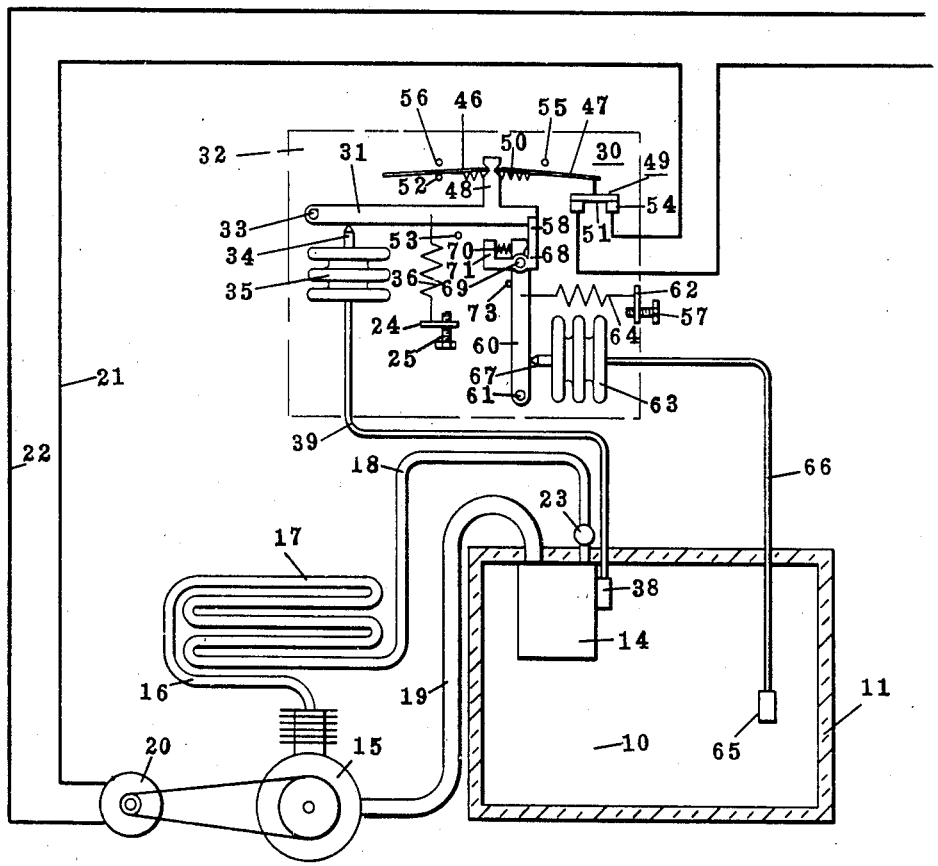
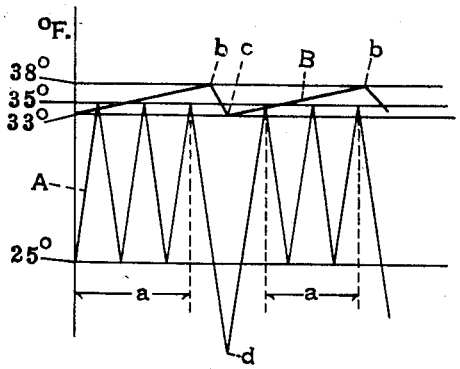
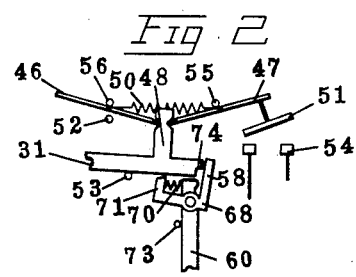

2,266,799

UNITED STATES PATENT OFFICE 2,266,799

CONTROL SYSTEM

Roy E. Raney, Columbus, Ohio, assignor to Ranco Incorporated, Columbus, Ohio

Application December 1, 1938, Serial No. 243,422

11 Claims. (Cl. 62—4)

This invention relates to a new and improved control method and apparatus for refrigerating systems and more particularly to a control method and control apparatus for a refrigerating system having a heat absorber for cooling a food storage space.

An object of the present invention is to provide a method of control for a refrigerating system having a heat absorber for cooling the atmosphere in a space, which method comprises establishing temperature cycles in the heat absorber, while the temperature of the atmosphere in the space is below a certain temperature, consisting of a warming and a cooling phase, the warming phase permitting the heat absorber to raise to a predetermined temperature above the melting point of ice and the cooling phase lowering the temperature of the heat absorber to a predetermined temperature below the freezing point of water, and when the atmosphere in the space raises above the said certain temperature to cause the cooling phase to be extended for cooling the air in the space to a predetermined temperature before the cooling phase is terminated.

Another object of the invention is to provide control apparatus for a refrigerating system of the type described above in which the apparatus responds solely to the temperature of the heat absorber to initiate a cooling phase of the heat absorber when the temperature of the absorber has risen above the melting point of ice and to terminate the cooling phase when the heat absorber has reached a predetermined lower temperature while the space to be cooled is below a predetermined temperature, and being responsive to the temperature of the atmosphere in the space for extending the cold phase of the heat absorber when the space to be cooled raises above a predetermined maximum temperature and terminating the extended cold phase of operation of the heat absorber when the temperature of the space is lowered to a predetermined temperature.

A further object of this invention is to provide a control apparatus for a refrigeration system, such as that described above, in which the control apparatus is operative to control the system to start and stop the cooling phases of the refrigerating cycles solely in response to predetermined temperatures of the heat absorber and having thermostatic means for preventing the stopping of the cooling phase of the cycle of the apparatus while the temperature of the space to be cooled is above a predetermined maximum temperature.

A still further object of the present invention is to provide a control for starting and stopping the cooling operation of an electrically operated refrigerating system which comprises a device responsive to the temperature of the heat absorber of a refrigerating system to actuate a switching member in response to predetermined high and low temperature limits of the heat absorber and a second device responsive to the temperatures in a space cooled by the heat absorber for blocking movement of the switching member in the switch opening direction while the temperature in the space is above a predetermined maximum temperature.

Other and further objects and advantages will be apparent from the following description, reference being had to the accompanying drawing wherein a preferred form of embodiment of the present invention is clearly shown.

In the drawing:

Fig. 1 is a diagrammatic view of a refrigerating system and control therefor;

Fig. 2 is a fragmentary view of part of the control apparatus showing the switch in the open position and the latching mechanism moved to block the switch in the closed position, and Fig. 3 is a graph illustrating the operating temperatures of the system.

One form of embodiment of the present invention is disclosed in the accompanying drawing, wherein a food storage cabinet 10 is provided with a heat absorber 14 disposed therein for cooling the atmosphere in the space. The walls 11 of the cabinet 10 are suitably insulated to prevent ready heat transfer between the interior and exterior of the cabinet for providing a suitable storage cabinet for perishable foods, such as meat and the like.

The heat absorber 14 may comprise an evaporator of any suitable type utilized in a compressor-condenser-expander type of refrigerating system. Refrigerant is circulated through the heat absorber by a compressor 15 that compresses the refrigerant and forces the same through a conduit 16 to a condenser 17 where the liquid refrigerant collects. The liquid refrigerant is then passed through a conduit 18 to a suitable pressure reducing valve 23 and into the heat absorber 14 where it expands and absorbs heat in the manner well known in the art. The expanded refrigerant is withdrawn from the heat absorber and conveyed to the compressor through a conduit 19. The compressor is actuated by an electric motor 20 supplied with power through lines 21 and 22.

The operation of the motor 20 is controlled by a thermostatically operated switching device designated generally at 30. The switching device comprises a switch actuating lever 31 pivotally mounted on a suitable frame 32 by a pivot pin 33. The lever 31 is adapted to be actuated about its pivot by the expansion and contraction of a sylphon bellows 35 that is opposed by a tension spring 36 having one end connected to the lever 31 and the opposite end connected to a plate 24 that is movable by a screw 25 for adjusting the tension of the spring. The adjustment of the spring 36 however, may be accomplished in any manner known in the art, and the disclosure herein is purely diagrammatical. The bellows 35 is provided with a pin 34 that connects the lever and the bellows. The bellows 35 is connected to a bulb 38 by a tube 39. The bellows, bulb and tube are filled with a temperature responsive fluid, such as methyl chloride. The bulb 38 is suitably connected in heat exchange relation with the heat absorber 14, as for example, by a metallic clamp so that the temperature of the bulb will follow the temperature of the heat absorber. Thus the pressure within the bulb 38, tube 39 and bellows 35 will increase and decrease according to the increase and decrease in the temperature of the heat absorber to cause expansion and contraction of the bellows 35.

The lever 31 is adapted to actuate a switch 49 that opens and closes the circuit of the motor 20. The construction of the switch may be of any convenient form, and in the drawing, the switch is represented diagrammatically as a snap acting toggle switch comprising two opposed snap members 46 and 47 each pivoted at adjacent ends on a lug 48 formed on the lever 31 and being connected by a tension spring 50. A contact bar 51 is suitably insulated from and attached to the end of the member 47, and is adapted to bridge two stationary contacts 54 to close the switch. The contacts 54 are connected in the line 21 of the motor circuit. The free end of the member 46 is adapted to move between stops 52 and 56 and the movement of the free end of member 47 is limited by the stop 55 and contacts 54. When the lever 31 is raised upwardly the pivoted ends of the members 46 and 47 are raised above the center of the spring 50 which snaps the ends of the members 46 and 47 downwardly to close the switch 45. When the lever 31 is lowered, the pivots of the members 46 and 47 are moved below the center of the spring 50 thus causing the spring to snap the two members upwardly against the stops 55 and 56 to open the switch. The lever 31 is limited in its downward movement by a stop 53.

In the preferred form of embodiment the spring 36 is adjusted and the stops 55 and 56 so positioned that the switch 45 will be opened to stop operation of the compressor 15 when the temperature of the heat absorber 14 reaches 25 deg. F. and closed to start operation of the compressor when the heat absorber reaches 35 deg. F. Thus the switching mechanism, so far as operated by the bellows 35, is adapted to control the compressor 15 to produce refrigerating cycles of operation which results in a cold phase and a warm phase in the heat absorber, the cold phase being initiated when the temperature of the heat absorber reaches 35 deg. and terminated when the temperature of the absorber reaches 25 deg. These cycles are represented graphically in Fig. 3 by the line A in the portion of the graph designated by a. Thus the cold phase of the heat absorber is initiated when the heat absorber has reached a defrosting temperature and terminated when the heat absorber attains a predetermined lower temperature. The warm phase of the cycle occurs when the cold phase is terminated and the heat absorber warms by absorbing heat from the surrounding atmosphere.

A thermostatic latching mechanism is provided for preventing the switch 49 from opening in the event that the temperature of the air within the cabinet 10 rises above a temperature considered unsafe for the preservation of food, as for example 38 deg. F. The latching mechanism comprises a lever 60 suitably pivoted to the frame 32 by a pin 61 and which is adapted to be moved about its pivot by the expansion and contraction of a bellows 63 opposed by a tension spring 64 connected to the lever and an adjustable plate 62 that is movable by a screw 57 suitably supported on the frame 32. The bellows 63 is connected to a bulb 65 by a tube 66. The bellows, tube and bulb are filled with a temperature responsive fluid such as methyl chloride. The bulb 65 is disposed within the cabinet 10, and is responsive to the temperature of the atmosphere in the cabinet. A push rod 67 is secured to the end of the bellows and engages the lever 60 to connect the bellows with the lever. A J shaped latch member 68 is suitably pivoted on the lever 60 at 69 and the leg 58 thereof extends upwardly for engaging the underside of the lever 31 to prevent opening movement of the switch. The member 68 is biased counterclockwise about its pivot by a spring 70 disposed between the lever 60 and the toe 71 of the member 68. The leg 58 is adapted to engage the lever 60 to limit the rotation thereof by the spring 70. The end of the leg 58 is adapted to engage in a notch 74 formed in the lower side of the lever 31 adjacent the end thereof when the lever 60 is moved to the left against a stop 73. The tension of the spring 64 is adjusted so that when the bulb 65 reaches 38 deg. F. the bellows 63 will expand and move the lever 60 counterclockwise against the stop 73 to move the leg 58 in alignment with the notch 74 so that downward movement of the lever 31 will be prevented and the switch cannot be opened until the leg 58 is withdrawn from the notch 74 by cooling of the bulb 65 to a predetermined temperature. If the switch 45 should be in the open position, that is, the lever 31 being lowered, when the lever 60 is moved to the stop 73, the leg 58 will abut the end of the lever 31 as shown in Fig. 2, and when the switch is finally closed by the bellows 35 raising the lever 31 above the end of the leg 58, the spring 70 will bias the leg to a position in alignment with the notch 74 so that when the lever 31 is lowered toward the switch opening position, due to cooling of the heat absorber 14, the leg will prevent opening of the switch 45 and the compressor 15 will continue operating and cause the heat absorber to be cooled below the temperature at which the bellows 35 is adapted to normally cause opening of the switch. When the air in the space has been reduced to a proper food preserving temperature, such as 33 deg. F. for example, the pressure in the bellows 63 will be reduced so that the spring 64 will move the lever 60 to the right, causing the lever 60 to engage the leg 58 and move the end thereof out of the notch 74. This permits the lever 31 to move downwardly and open the switch 45 to stop operation of the compressor terminating the extended cold phase of the temperature cycle. Thus the cold phase of the cycle will be extended in response to a predetermined maximum temperature in the food space, and will be terminated only when the temperature of the air in the space is lowered to a predetermined temperature. The above described phase of operation of the control system is graphically illustrated in Fig. 3, wherein line A illustrates the temperature of the heat absorber and the line B the temperature of the atmosphere of the space. The portions of the graph within *a* represent the operation of the system while the air temperature of the space is between a maximum and a minimum, of 38 deg. and 33 deg. The latch mechanism is rendered operative to prevent opening of the switch 45 at *b* and is rendered inoperative at *c* when the air temperature of the space is lowered to 33 deg. by the extension of the cold phase of the operating cycle of the heat absorber to *d*. It is to be understood that the frequency of cycles depicted in Fig. 3, are not necessarily typical of normal operation of the system as there may be more or less cycles shown at *a*, and the temperature shown at *d* may be of a different degree and duration, depending on heat losses in the cabinet and the capacity of the heat absorber.

It is apparent that the termination of the cold phase will be determined by the temperature of the air in the space reaching a predetermined low, but as long as the air in the cabinet space is below a predetermined temperature the refrigerating system will operate in cycles with the heat absorber cycling between the temperatures of 35 deg. and 25 deg. F. as described above. This cycling of the heat absorber causes circulation of the air in the cooling space which further aids in the preservation of foodstuffs. Also the heat absorber will be defrosted on each cycle of operation thereby maintaining moisture in the air and preventing the collection of ice on the heat absorber that would decrease the cooling efficiency thereof.

It is also apparent that when the storage space is kept closed over a period of time and the food stored therein has been cooled, there will be less demand on the refrigerating system, and the heat absorber will not operate at extremely low temperatures. But when warm foodstuffs are placed in the storage cabinet the heat absorber will operate at a much lower average temperature to properly cool the space.

It is to be understood that the latch mechanism may be adjusted to cause opening of the switch 45 at any desired temperature or that other mechanism than a latch may be utilized to prevent opening of the switch, the latch mechanism herein shown merely represents one form of accomplishing the results obtained.

While the form of embodiment of the present invention as herein disclosed constitutes a preferred form, it is to be understood that other forms might be adopted, all coming within the scope of the claims which follow:

I claim:

1. The method of controlling the operation of a cyclically operated refrigerating system for cooling a medium which comprises initiating the cooling phase of the heat absorber solely in response to a temperature of the heat absorber, and terminating the cooling phase of the heat absorber when the temperature of the heat absorber has reached a predetermined lower temperature if the medium is below a predetermined temperature but preventing the termination of the cooling phase when the temperature of the medium is above the last mentioned predetermined temperature until the temperature of the medium to be refrigerated attains a predetermined temperature.

2. The method of controlling the operation of a cyclically operated refrigerating system for cooling a medium which comprises, initiating the cooling phase of the heat absorber solely in response to a temperature of the absorber above the melting point of ice, and terminating the cooling phase of the heat absorber when the temperature of the heat absorber has reached a predetermined lower temperature while the temperature of the medium is below a predetermined temperature, and preventing the termination of the cooling phase when the temperature of the medium is above the last mentioned predetermined temperature until the temperature of the medium to be refrigerated attains a lower predetermined temperature.

3. The method of controlling the operation of a refrigerating system for cooling a medium which comprises, operating the system to produce cold phase and warm phase temperature cycles of the heat absorber while the temperature of the medium is below a predetermined temperature, and when the temperature of the medium is above a predetermined high temperature, continuing the cold phase of the cycle until the temperature of the medium is reduced to a predetermined temperature below the second mentioned predetermined temperature, regardless of the reduction in the temperature of the heat absorber below the temperatures of the first mentioned cold phase temperature cycles.

4. The method of controlling the operation of a refrigerating system for cooling a medium which comprises, operating the system to produce cold phase and warm phase temperature cycles of the heat absorber while the temperature of the medium is below a predetermined temperature, and extending the cold phase of the cycle if the temperature of the medium reaches a predetermined maximum temperature and terminating the said extended cold phase in response to the temperature of the heat absorber when the temperature of the medium reaches a lower temperature than said predetermined maximum temperature.

5. In a refrigerating system, a heat absorber disposed to cool a medium; means for supplying a cooling fluid to the heat absorber solely in response to a predetermined temperature of the absorber and for terminating the supply of the cooling medium to the absorber in response to a lower temperature of the heat absorber; and means responsive solely to the temperature of the medium for preventing termination of the supply of the cooling fluid until the temperature of the medium is lowered to a predetermined temperature.

6. In combination, a refrigerator cabinet having a medium therein; a closed refrigerating system including a heat absorber and refrigerant circulating means, said heat absorber being adapted to cool the medium in said cabinet; and control mechanism for the system for causing the heat absorber to operate at different temperatures, said control mechanism including means for initiating a cold phase of the heat absorber solely in response to a predetermined high temperature of the heat absorber and for terminating the cold phase of the heat absorber when the heat absorber attains a predetermined lower temperature; and means for delaying the termination of said cold phase until the medium in the cabinet attains a predetermined low temperature.

7. In combination, means forming an enclosure having a medium therein, of a heat absorber in heat transfer relation with the medium; means for circulating refrigerant through said heat absorber solely in response to a predetermined temperature in the absorber above the freezing point of water and to terminate circulation of the refrigerant through the heat absorber in response to a temperature lower than said predetermined temperature while the temperature of the medium is below a certain temperature; and means for delaying termination of said circulation until the temperature of the medium is lowered to said certain temperature, the last mentioned means being rendered effective when the temperature in the medium attains a predetermined maximum.

8. The method of controlling the temperature of a medium which consists in causing cyclical variations in temperature of a heat interchanger to which the medium is subjected by initiating the warming and cooling phases of the cycles in response to low and high temperature conditions of the heat interchanger as long as the temperature of the medium does not vary beyond a desirable predetermined temperature thereof; and continuing one of the phases of operation of the heat interchanger in response to the variation of the temperature of the medium beyond said one predetermined temperature until the medium attains said predetermined temperature.

9. The method of controlling the operation of a cyclically operated refrigerating system for cooling a medium, which comprises initiating a cooling phase of the heat absorber solely in response to a predetermined temperature of the heat absorber, continuing the cooling phase of the heat absorber as long as the temperature of the medium is above a predetermined temperature, and if the temperature of the medium is below the second mentioned predetermined temperature, terminating the cooling phase of the heat absorber in response to the temperature of the heat absorber.

10. In combination, a refrigerator cabinet having a medium therein; a closed refrigerating system including a heat absorber and means for circulating refrigerant through the absorber, said heat absorber being arranged to cool the medium in said cabinet; and control means for the system causing alternate cold and warm phases of temperature cycles of the absorber, said control means including a thermostatic system responsive to a predetermined temperature of the medium in the cabinet for effecting a change from one of said phases to the other, said control means including a second thermostatic system responsive solely to the temperature of the heat absorber and operating independently of the other thermostatic system for positively effecting a change from said other phase to the said one phase when the heat absorber attains a predetermined temperature.

11. In a heat interchanger system, a heat exchanger in heat exchange relation with a medium; means for supplying a heat exchange fluid to the exchanger; control apparatus responsive to the temperature of the exchanger for controlling said means to produce temperature cycles of the exchanger, said apparatus being adapted to initiate one phase of a temperature cycle at one temperature and to terminate the one phase at another temperature; and means responsive to the temperature of the medium for preventing the effective termination of said one phase, in response to a variation in temperature of the medium from a certain desired temperature, until the medium attains said certain desired temperature.

ROY E. RANEY.